(No Model.)

W. QUINN.
FISHING DEVICE.

No. 581,768. Patented May 4, 1897.

WITNESSES:
E. A. Ryan
Chas. E. Brock

INVENTOR
William Quinn,
BY
O'Meara & Co.
ATTORNEYS

United States Patent Office.

WILLIAM QUINN, OF STURGIS, MISSISSIPPI.

FISHING DEVICE.

SPECIFICATION forming part of Letters Patent No. 581,768, dated May 4, 1897.

Application filed July 15, 1896. Serial No. 599,292. (No model.)

*To all whom it may concern:*

Be it known that I, WILLIAM QUINN, residing at Sturgis, in the county of Oktibbeha and State of Mississippi, have invented a new and Improved Fishing-Line, of which the following is a specification.

This invention relates generally to fishing-lines; and the object of the invention is to provide a device which shall be somewhat in the nature of a fly and dispense with the use of bait.

The objection to a fly is that it can only be used in shallow water and one must troll the same along the surface of the water, and the operations of trolling and casting are more or less difficult.

The object of my invention is to avoid these objections and provide a device which can be used in any depth of water and one which will not require any great amount of skill in its manipulation.

My invention seeks to utilize the instinct of a fish to bite at another fish, particularly one smaller than himself; and my invention consists, therefore, in placing a reflecting-surface upon the line in which the fish will see himself reflected, and also a hook upon said line adjacent to the reflecting-surface, so that when the fish bites at the supposed approaching fish he will be caught upon the hook.

The invention consists also in certain details of construction and novelties of combination, all of which will be fully described hereinafter and pointed out in the claims.

Figure 1:
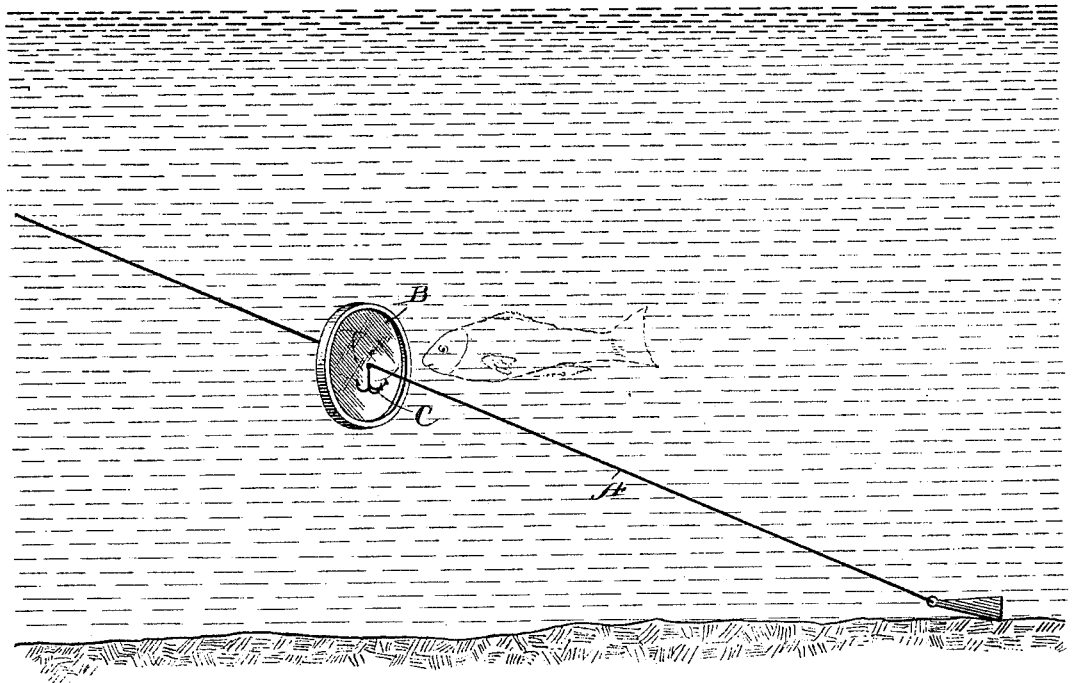
Figure 2:
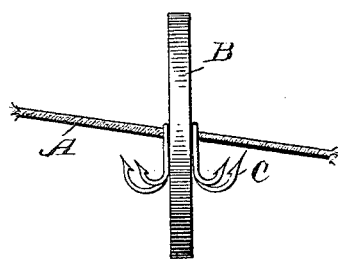
Figure 3:
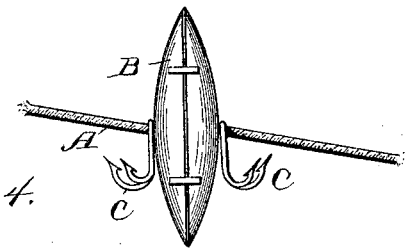
Figure 4:
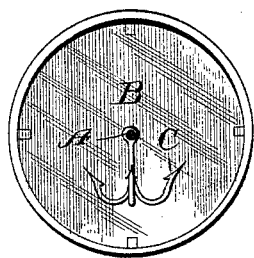

In the drawings forming a part of this specification, Figure 1 shows the invention in use. Fig. 2 is a side view showing hooks on both sides of the reflecting-surface. Fig. 3 shows a slight modification; Fig. 4, a face view.

In carrying out my invention I employ a line A, which may be of any desired size and may have any preferred form of sinker and float. Adjacent to the end of the line is arranged a reflecting-surface B, which is preferably circular in form, and it is also preferred to make both surfaces reflecting, so that should a fish approach from either side his image will be reflected. The circular disk B may be made of glass, in which case the surfaces will be gilded with quicksilver, or said disk may be made of metal and the surfaces nickel-plated and polished. These are mere details, however, as it is not material of what the disks are constructed so long as both surfaces are highly polished, so that a fish approaching from either side will see his own image. The disk is centrally perforated, so that the line A can pass therethrough, and attached to the line upon both sides of the disk B are the hooks C C, said hooks being very close to the disk, so that as the fish approaches and attempts to bite he will be caught upon the hook.

In Fig. 3 I have shown a slightly-modified form of construction in which the disk is formed with convex surfaces on each side, so that the image of the fish will appear smaller than the fish himself and the tendency to bite will be still greater.

It will thus be seen that I provide a device which is adapted for game fish and does away with both the fly and bait. It will also be noticed that the device is exceedingly cheap and simple and can be quickly and easily applied and used.

Having thus described my invention, what I claim, and desire to secure by Letters Patent, is—

1. The combination with a disk or disks, the encircling band having lugs adapted to engage the face of the disk or disks the line passing centrally through the said disk or disks and the hooks arranged upon each side of the disk or disks and adjacent thereto, substantially as shown and described.

2. The combination with a disk having both faces polished, of a line passing centrally through the said disk, and the hooks carried upon the line adjacent to the faces of the disk substantially as shown and described.

3. The combination with a disk, both faces of which are convex, of a line passing centrally through the disks and the hooks arranged upon the line adjacent to the faces of the disks substantially as shown and described.

WILLIAM QUINN.

Witnesses:
F. N. SANDERS,
JOHN QUINN.